United States Patent [19]

O'Neal et al.

[11] Patent Number: 4,970,246

[45] Date of Patent: Nov. 13, 1990

[54] ACETYLENE STORAGE VESSEL FILLER AND METHOD

[75] Inventors: Paul S. O'Neal, Paint Rock; Michael C. Camp, Arab, both of Ala.

[73] Assignee: Coyne Cylinder Company, Huntsville, Ala.

[21] Appl. No.: 265,545

[22] Filed: Nov. 1, 1988

[51] Int. Cl.$^5$ ............... C04B 38/00; F17C 11/00
[52] U.S. Cl. ............... 524/5; 524/514; 106/75; 106/86; 106/119; 106/120; 206/0.7
[58] Field of Search ............... 521/64; 524/5, 514; 106/75, 86, 120, 119; 206/0.7

[56] References Cited

U.S. PATENT DOCUMENTS

| | | | |
|---|---|---|---|
| 2,883,040 | 4/1959 | Pater et al. | 206/0.7 |
| 2,944,911 | 7/1960 | Muller et al. | 106/120 |
| 3,475,189 | 10/1969 | Carter et al. | 106/120 |
| 3,539,364 | 11/1970 | Haddeland | 106/120 |
| 3,540,865 | 11/1970 | Pape | 431/326 |
| 3,783,092 | 1/1974 | Majumdar | 106/99 |
| 3,794,505 | 2/1974 | Helser et al. | 106/120 |
| 3,859,106 | 1/1975 | Majumdar | 106/120 |
| 3,887,386 | 6/1975 | Majumdar | 106/50 |
| 3,901,720 | 8/1975 | Majumdar | 106/50 |
| 3,926,652 | 12/1975 | Sisco, Jr. et al. | 106/120 |
| 4,010,777 | 3/1977 | Mogensen | 141/4 |
| 4,129,450 | 12/1978 | Flanigen et al. | 106/120 |
| 4,161,495 | 7/1979 | Detz | 585/4 |
| 4,179,303 | 12/1979 | Shannon | 106/120 |
| 4,279,695 | 7/1981 | Winterbottom | 162/146 |
| 4,349,463 | 9/1982 | Flanigen | 206/0.7 |
| 4,444,574 | 4/1984 | Tradewell | 428/408 |
| 4,467,040 | 8/1984 | Bruni et al. | 106/120 |
| 4,467,041 | 8/1984 | Bruni et al. | 106/120 |
| 4,515,636 | 5/1985 | Carney et al. | 106/90 |

FOREIGN PATENT DOCUMENTS

| | | | |
|---|---|---|---|
| 675072 | 11/1963 | Canada. | |
| 127960 | 12/1984 | European Pat. Off. | 106/120 |
| 0264550A2 | 4/1988 | European Pat. Off. | |
| 1401972 | 8/1975 | United Kingdom. | |

OTHER PUBLICATIONS

E. I. Du Pont de Nemours & Co. (Inc.), "KEVLAR Aramid-The Fiber That Lets You Re-Think Strength and Weight".

E. I. Du Pont de Nemours & Co. (Inc.), "KEVLAR-The Miracle Is All Around You".

E. I. Du Pont de Nemours & Co. (Inc.), "KEVLAR-A Reinforcing Fiber Substitute for Asbestos".

E. I. Du Pont de Nemours & Co. (Inc.), "KEVLAR-Properties and Uses of KEVLAR 29 and KEVLAR 49 in Electromechanical Cables and Fiber Optics", Information Bulletin K-506A, Jun., 1980.

Primary Examiner—John C. Bleutge
Assistant Examiner—David Buttner
Attorney, Agent, or Firm—Caruthers, Herzog, Crebs & McGhee

[57] ABSTRACT

A slurry having an aqueous liquid and dispersed solids may be vacuum filled into an acetylene storage container and indurated to yield a lime-silica matrix with a porosity between about 88 percent to 92 percent. The matrix includes a mixture of aromatic polyamide fibers and oxidized polyacrylonitrile fibers. At least some of these fibers are fibrillated and the fibers are in an amount of about 3.8 wt. % to about 12 wt. % matrix.

20 Claims, No Drawings

ACETYLENE STORAGE VESSEL FILLER AND METHOD

FIELD OF THE INVENTION

The present invention relates to fillers for acetylene storage vessels and more particularly to a monolithic, lime-silica matrix formable from a slurry and including certain nitrogen containing, high temperature resistant polymeric fibers rather than asbestos fibers.

BACKGROUND OF THE INVENTION

Acetylene is a colorless gas at atmospheric temperatures and pressures that burns in air with an intensely hot, luminous and smoky flame. Acetylene is used in a variety of applications, such as chemical synthesis, oxyacetylene welding, cutting, heat treating and for lighting purposes in buoys, beacons and similar devices. Acetylene can be liquified and solidified relatively easily. However, in both the liquid and solid states, when ignited, acetylene may explode with extreme violence. Although acetylene is not explosive at ordinary atmospheric temperature, at two atmospheres or more it is explosive by spark or decomposition.

Acetylene is classified by the Department of Transportation as a flammable compressed gas, and must be shipped in steel cylinders manufactured to particular specifications. These specifications require, among other things, that the steel used in the cylinder meet certain chemical and physical requirements, and that the cylinder fillers have 92 percent or less porosity when charged with a specified amount of solvent, and be protected by adequate safety release devices.

Acetylene cylinders must avoid the decomposition characteristics of the gas by providing a porous mass packing material having minute cellular spaces so that no pockets of appreciable size remain where "free" acetylene in gaseous form can collect. Acetone dissolves 25 volumes of acetylene at 15° C. and 760 mm, but 300 volumes at 12 atmospheres. Thus, the porous mass of acetylene cylinders is typically saturated with acetone or another solvent in which acetylene dissolves.

Previously known acetylene cylinders, when properly constructed and filled with porous material containing a suitable solvent, have safely avoided the hazard of high-pressure acetylene. In such conventional cylinders, asbestos fibers have commonly been used as a reinforcing agent for a hardened calcium silicate filler mass. Because of concerns posed by uses of asbestos fibers, attempts are being made to find a substitute for asbestos fibers in the calcium silicate fillers of acetylene storage vessels.

Thus, U.S. Pat. No. 4,349,463, inventor Flanigen issued Sept. 14, 1982, reissue filed May 22, 1985, discloses an acetylene storage vessel in which asbestos fibers have been replaced with alkali resistant glass fibers. These alkali resistant glass fibers are said to reinforce as well as function as suspending agent for the aqueous slurry from which the hardened silicate filler mass is manufactured. U.S. Pat. Nos. 4,467,040, inventors Brumi at al., issued Aug. 21, 1984 and 4,467,041, discloses the replacement of asbestos by utilizing amorphous, ultrafine synthetic silicas made by the pyrogeneation of silicon tetrachloride or chemical precipitation of the soluble silicate in an aqueous medium.

Because of the unique criteria for acetylene cylinder filler compositions, such as porosity, freedom from internal voids, little or no space between outer filler surface and inside walls of the containers, adequate strength and resilience, as well as manufacturing considerations and the safety requirements, attempts to replace asbestos fibers with other components have not been particularly successful and have not led to predictable results. Thus, for example, acetylene storage fillers made with fiberglass rather than asbestos fibers have been found to show some shrinkage and a considerable number of randomly oriented cracks. A filler made with cotton fiber rather than asbestos has been reported to contain many elongated pockets arranged in a herringbone pattern from the top to the bottom of the cylinder. Fillers dependent upon alkali resistant glass fibers as a reinforcing agent incur difficulties because the fibers do not fibrillate during mixing of slurries so that care must be taken to prevent overmixing. Many manmade fibers, such as polyester and rayon fibers, have been found to lead to a tendency of settling in the slurry during manufacture, which causes difficulties in obtaining the necessary composition uniformity when hardened within the cylinder. The addition of usual supplementary ingredients as suspending agents tends to decrease strength and porosity and adversely affects the acetylene discharge properties.

Accordingly, the need for new acetylene storage vessel fillers without asbestos fibers but with comparable performance to the prior fillers with asbestos remains.

SUMMARY OF THE INVENTION

It is an object of the present invention to provide acetylene cylinder filler compositions with sufficient porosity for acetylene charging and discharging properties, freedom from internal voids, little or no space between outer filler surface and inside walls of the container, adequate strength and resilience and of simple manufacture.

In one aspect of the present invention, a filler for acetylene storage vessels comprises a monolithic, lime-silica matrix having a porosity between about 88 percent to 92 percent. The matrix includes a mixture of aromatic polyamide fibers and oxidized polyacrylonitrile fibers substantially evenly distributed throughout the matrix and providing mechanical reinforcement therefor. At least some of these fibers are fibrillated, and the fibers are in an amount of from about 3.8 wt. % to about 12 wt. % of the matrix, more preferably about 5 wt. % to 6 wt. %.

In another aspect of the invention, a slurry, useful for forming such an acetylene storage filler, comprises an aqueous liquid and solids dispersed therein with the liquid to solids being in a weight ratio of between about 2.8:1 to 3:1. The solids consist essentially of calcium hydroxide, silicon dioxide, a water-absorbing siliceous additive, aromatic polyamide fibers and oxidized polyacrylonitrile fibers. This slurry may be vacuum filled or mechanically pumped into an acetylene storage container and indurated to yield the lime-silica matrix.

DETAILED DESCRIPTION OF THE PREFERRED EMBODIMENT

Acetylene cylinders consist of metal shells filled with a porous material and this material is charged with a suitable solvent in which acetylene is dissolved.

The inventive filler comprises a monolithic, lime-silica matrix which has at least about 3.8 wt. % fibers selected from a mixture of aromatic polyamide fibers and oxidized polyacrylonitrile fibers. The inventive filler is prepared from a slurry, as hereinafter more fully described.

The lime-silica matrix is formed from lime, preferably hydrated lime (that is, calcium hydroxide) and a two-component siliceous aggregate. A first component of the silicaceous aggregate is sand (that is, silicon dioxide), preferably ground sand having a particle size not greater than about 200 mesh (about 70 microns), more preferably having a particle size of about 395 mesh (about 40 microns). Such ground sand is sometimes referred to as "silica flour" and is commercially available from a variety of sources, such as, for example, Ottawa Silica. The sand must be present in a sufficient amount to assist in providing acceptable crushing strength of the resultant matrix, as further discussed below. The calcium hydroxide and silicon dioxide are preferably a weight ratio of between about 1:1.5 to 1:1.65.

The proportion of sand and the second silicaceous additive is selected for optimum viscosity of the slurry during cylinder filling and to provide the necessary crushing strength of the hardened filler. Thus, the second component of the silicaceous aggregate has water-absorbing properties, preferably is in a weight ratio with respect to the sand of about 6:1, and is selected from one or more of diatomaceous earth, expanded perlite, fumed silica, attapulgite, sodium bentonine, vermiculite or zeolite. The water-absorbing second component preferably is at least in majority part diatomaceous earth, more preferably substantially all diatomaceous earth. Diatomaceous earth is composed of about 80-88 percent silica, and is sometimes called diatomite, kieselguhr, or infusorial earth. As known, it absorbs about 1.5 to about 4 times its weight of water. Expanded perlite, attapulgite, sodium bentonite, or zeolite, if utilized in place of part or all the diatomaceous earth, typically requires a larger amount of the silica flour and gives a less viscous slurry during preparation of the filler.

It has been found that the second silicaceous component must be present, or else a very brittle filler results. In addition, the water absorbing, silicaceous second component functions as a thickening and suspending agent for the slurry from which the filler is prepared.

The hardened filler has a porosity of between about 88 percent to about 92 percent, and preferably has a compressive strength of at least about 250 psi (about 1725 KPa). The necessary porosity is achieved in large part by preparing the slurry with a certain critical water to solids ratio, further described below. The necessary compressive strength is provided, as already described, in part by the presence of sand and in addition by the presence of certain fibers in the filler.

Aromatic polyamide fibers, sometimes called "aramid" are synthetic poly(p-phenylene terephthalamide) compounds with good high temperature properties. They are commercially available from E. I. duPont de Nemours & Co. under the name "Kevlar" in a variety of physical forms. Among these forms is a pulp (called type 979), which is a very short, highly fibrillated fiber. Preferably, this highly fibrillated pulp is utilized. These polyamide fibers appear to be somewhat hydrophilic in the strongly alkaline slurry, which assists in preventing separation of water from the slurry.

Oxidized polyacrylonitrile fibers are commercially available from Great Lakes carbon under the name "Fortafil OPF(C)" in several forms. They include about 66 percent carbon, about 24 percent nitrogen, and minor amounts of oxygen and hydrogen. A preferred form is chopped fibers having a length of about 3 to 35 mm.

It has been found that a combination of aromatic polyamide fibers and oxidized polyacrylonitrile, preferably in a weight ratio of about 2.25:1, provides a considerably better matrix than use of either by itself. By contrast, a slurry having only the aromatic polyamide fibers has been found to provide a filler with compressive strength less than about 75 percent of the inventive filler, while a slurry having only the polyacrylonitrile fibers is workable but is associated with a high rate of excessive filler shrinkage. Both fibers are high temperature resistant and non-inflammable.

Preferably, the mixture of aromatic polyamide fibers and oxidized polyacrylonitrile fibers are in an amount between about 3.8 wt. % to about 12 wt. % with respect to the lime-silica matrix, more preferably between about 5 to about 6 wt. %.

In preparing the inventive filler, the solid components are admixed with an aqueous liquid, preferably water, in a weight ratio of liquid to solid between about 2.8:1 to about 3:1 to form the slurry. An empty acetylene storage container is vacuum filled with the slurry, the filled container is indurated while preventing loss of water, and the indurated container is then dried to remove water and yield matrix density of between about 270-285 g/liter. The vacuum filling step preferably includes vibrating the container at least during the filling and is preferably conducted at a reduced pressure of between about 635 torr to about 737 torr.

The indurating step is preferably conducted at a temperature between 190° C. to about 245° C. for at least about 16 hours and up to about 30 hours, primarily depending upon the cylinder size. Excess water loss is prevented during the induration to permit steam buildup, preferably to a nominal pressure of about 150 to 300 psi. Following the induration, water is removed, preferably by reduced pressure evaporation.

The following experimental methods, materials and results are described for purposes of illustrating the present invention. However, other aspects, advantages and modifications within the scope of the invention will be apparent to those skilled in the art to which the invention pertains.

EXAMPLE I

A preferred embodiment (a) having the formulation described in Table I was prepared by admixing the dry ingredients (all but water and the oxidized polyacrylonitrile fibers) for about one-two minutes, adding the oxidized polyacrylonitrile fibers and mixing for another about one-two minutes. Water was then added to the mixture, which was admixed for about one-three minutes until the slurry became relatively homogeneous, with fibers well dispersed, and exhibited good water retention properties. The formulation was then inserted into cylinders by vacuum filing in conjunction with vibration. The fill times are about 45 seconds to two minutes, depending on the cylinder size. Each cylinder is then subjected to a bumping cycle of a duration 20 seconds to 3.5 minutes depending on the cylinder size. This bumping subjects the cylinder to 275 to 310 drops per minute from a height of ⅝ to ⅞ inch. The bumping cycle is followed by insertion of additional slurry to fill void, if present, created by densification and/or deaeration of the slurry during the bumping cycle. The bumping push-out process may be repeated two to three times depending upon the cylinder size. The filled cylinders are indurated for times varying from 16 to 30 hours at temperatures ranging from 375° F. to 450° F., primarily depending upon the cylinder size.

TABLE I

| Embodiment (a) | Wt. % |
| --- | --- |
| Hydrated lime | 10.7 |
| Diatomaceous earth | 12.0 |
| Silica flour (375 mesh) | 2.0 |
| Fortafil OPF(C), 1.4" fibers | 0.4 |
| Kevlar 979 pulp fibers | 0.9 |
| Water | 74.0 |

The cylinders were fitted with a device which prevents excess water loss and permits steam build-up within the cylinders. They were indurated (cured) at 375°–425° F. for about 24 hours. Following induration, the cylinders were drilled with a standard 2.75 inch drill bit and then dried for a total of about 4-½ to five days.

POROSITY

Porosity may be measured by several methods. In the boiling water method, cubic filler blocks (about 10×10×10 cm) are weighed and measured for length, width and height. The blocks are baked for 24 hours at 425° and allowed to cool in a dessicator for 24 hours. The blocks are boiled in water for 24 hours and then soaked in cold water for 24 hours. The weight of blocks after water absorption is recorded and the percent porosity calculated.

The porosity of various inventive filler batches has ranged between 89.3 percent and 91.0 percent.

While the invention has been described in connection with specific embodiment s thereof, it will be understood that it is capable of further modifications, and this application is intended to cover any variations, uses or adaptations of the invention following, in general, the principles of the invention and including such departures from the disclosure as come within the known or customary practice in the art to which the invention pertains and as may be applied to the essential features hereinbefore set forth, and as fall within the scope of the invention and the limits of the appended claims.

What is claimed is:

1. A filler for acetylene storage vessels comprising: a monolithic, lime-silica matrix having a porosity between about 88 percent to 92 percent, the matrix having at least about 3.8 wt. % high temperature resistant, synthetic polymeric fibers substantially evenly distributed throughout the matrix, the fibers being a mixture of aromatic polyamide fibers and oxidized polyacrylonitrile fibers, the matrix including lime, a siliceous aggregate having a first and second component, the first component being sand, the second component consisting essentially of one or more of diatomaceous earth, expanded perlite, fumed silica, attapulgite, sodium bentonite, vermiculite or zeolite.

2. The filler as in claim 1 wherein the aromatic polyamide and oxidized polyacrylonitrile fibers together are in an amount of about 3.8 wt. % to about 12 wt. % with respect to the matrix.

3. The filler as in claim 2 wherein the fibers together are in an amount between about 5 wt. % and 6 wt. %.

4. The filler as in claim 2 wherein at least some of the synthetic polymeric fibers are fibrillated.

5. The filler of claim 2 wherein the second component is diatomaceous earth.

6. The filler as in claim 3 wherein the second component is diatomaceous earth, and the aromatic polyamide fibers are in a weight ratio with respect to the oxidized polyacrylonitrile fibers of about 2.3:1.

7. The filler as in claim 1 wherein the sand has a particle size of about 40 microns.

8. The filler as in claim 1 wherein the first and second components of the filler are in a weight ratio of about 1:6.

9. The filler of claim 1 wherein the lime and the siliceous aggregate have a weight ratio between about 1:1.5 to 1:1.65.

10. The filler of claim 9 wherein the aromatic polyamide fibers are in a weight ratio with respect to the oxidized polyacrylonitrile fibers of about 2.3:1, the second component is diatromaceous earth and the siliceous additive is in a weight ratio with respect to the silicon dioxide of about 6:1.

11. A slurry, useful for forming acetylene storage filler, comprising:
an aqueous liquid having solids dispersed therein, the liquids to solids in a weight ratio of between about 2.8:1 to 3:1, the solids consisting essentially of calcium hydroxide, silicon dioxide, a water-absorbing siliceous additive, and nitrogen containing, high temperature resistent synthetic polymeric fibers, the calcium hydroxide and silicon dioxide in a weight ratio of between about 1:1.5 to 1:1.65, the polymeric fibers in an amount between about 3.8 wt. % to about 12 wt. % with respect to the solids.

12. The slurry as in claim 11 wherein the synthetic polymeric fibers are a mixture of oxidized polyacrylonitrile and aromatic polyamide in a weight ratio of about 1:2.3.

13. The slurry as in claim 11 wherein the siliceous additive is selected from the group consisting of diatomaceous earth, expanded perlite, fumed silica, attapulgite, sodium bentonite, vermiculite or zeolite.

14. The slurry as in claim 11 wherein the siliceous additive is in a weight ratio with respect to the silicon dioxide of about 6:1.

15. The slurry as in claim 11 wherein the silicon dioxide has a particular size between about 40 microns and about 60 microns.

16. A slurry, useful for forming acetylene storage filler, comprising:
an aqueous liquid having solids dispersed therein, the liquids to solids in a weight ratio of between about 2.8:1 to 3:1, the solids consisting essentially of calcium hydroxide, a siliceous aggregate having a first and second component, the first component being sand, the second component consisting essentially of one or more of diatomaceous earth, expanded perlite, fumed silica, attapulgite, sodium bentonite, vermiculite or zeolite, and nitrogen containing, high temperature resistant synthetic polymeric fibers, the polymeric fibers consisting essentially of a mixture of oxidized polyacrylonitrile and aromatic polyamide, the calcium hydroxide and siliceous aggregate in a weight ratio of between about 1:1.5 to 1:1.65, the polymeric fibers in an amount between about 3.8 wt. % to about 12 wt. % with respect to the solids.

17. A slurry as set forth in claim 16 wherein the polyacrylonitrile and aromatic polyamide fibers are in a weight ratio of about 1:2.3.

18. A slurry as set forth in claim 16 wherein the second component is diatomaceous earth.

19. A slurry as set forth in claim 18 wherein the second component is in a weight ratio with respect to the sand of about 6:1.

20. A slurry as set forth in claim 16 wherein at least some of the fibers are fibrillated and the aromatic polyamide fibers are in a weight ratio with respect to the oxidized polyacrylonitrile fibers of about 2.3:1.

* * * * *